United States Patent
Friend et al.

(10) Patent No.: US 9,593,942 B2
(45) Date of Patent: Mar. 14, 2017

(54) CYLINDER POSITION DETERMINATION USING FIBER OPTIC SHAPE SENSING

(71) Applicant: Caterpillar Inc., Peoria, IL (US)

(72) Inventors: Paul R. Friend, Morton, IL (US); Kenneth L. Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 339 days.

(21) Appl. No.: 14/506,939

(22) Filed: Oct. 6, 2014

(65) Prior Publication Data
US 2016/0097408 A1    Apr. 7, 2016

(51) Int. Cl.
*F15B 15/28* (2006.01)
*G01B 11/16* (2006.01)
*G02B 6/04* (2006.01)

(52) U.S. Cl.
CPC .......... *G01B 11/18* (2013.01); *F15B 15/2876* (2013.01); *G02B 6/04* (2013.01)

(58) Field of Classification Search
CPC ...... F15B 15/2876; F15B 15/28; G01B 11/18; G01B 6/04
USPC .................................................. 91/1; 92/5 R
See application file for complete search history.

(56) References Cited

U.S. PATENT DOCUMENTS

| | | | |
|---|---|---|---|
| 5,247,172 A | 9/1993 | Riemer | |
| 6,484,620 B2 | 11/2002 | Arshad et al. | |
| 6,710,327 B2 * | 3/2004 | Arshad | F15B 15/2876 250/227.11 |
| 7,047,865 B2 | 5/2006 | Neumann | |
| 7,634,155 B2 | 12/2009 | Pawelski et al. | |
| 7,715,994 B1 * | 5/2010 | Richards | G01M 5/0016 702/42 |
| 7,757,547 B2 | 7/2010 | Kageyama et al. | |
| 7,781,724 B2 * | 8/2010 | Childers | A61B 1/00165 250/227.14 |
| 8,116,601 B2 * | 2/2012 | Prisco | G01L 1/246 385/12 |
| 8,183,520 B2 * | 5/2012 | Prisco | G01B 11/18 250/227.14 |
| 2013/0308138 A1 | 11/2013 | 'T Hooft et al. | |

FOREIGN PATENT DOCUMENTS

| | | |
|---|---|---|
| FR | 2591736 | 6/1987 |
| JP | S62110005 | 5/1987 |
| JP | H08232913 | 9/1996 |

* cited by examiner

*Primary Examiner* — Thomas E Lazo
(74) *Attorney, Agent, or Firm* — L. Glenn Waterfield

(57) ABSTRACT

A system for determining the stroke of a hydraulic cylinder is provided. The hydraulic cylinder includes a barrel with a rod that slidably extends therefrom. A fiber optic shape sensing system is positioned to determine the stroke of the rod relative to the barrel. An interrogation module is fixed to a reference frame. A fiber bundle is joined to the interrogation module at a proximal end and a fiber termination at a distal end, which is joined to the connecting end of the rod. A signal conditioning module connected to the interrogation module is configured to compute the location of at least one position of the fiber bundle relative to the reference frame; and provide an output indicative of the stroke of the connecting end relative to the barrel.

4 Claims, 4 Drawing Sheets

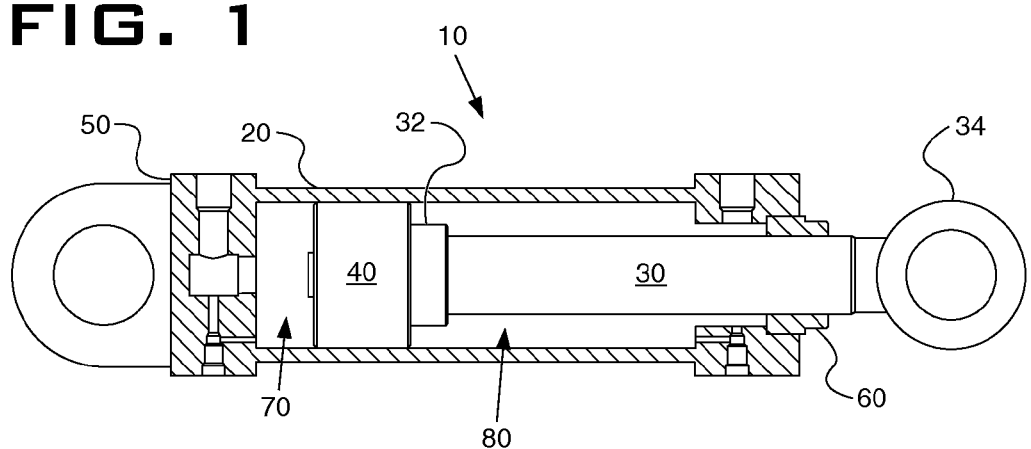
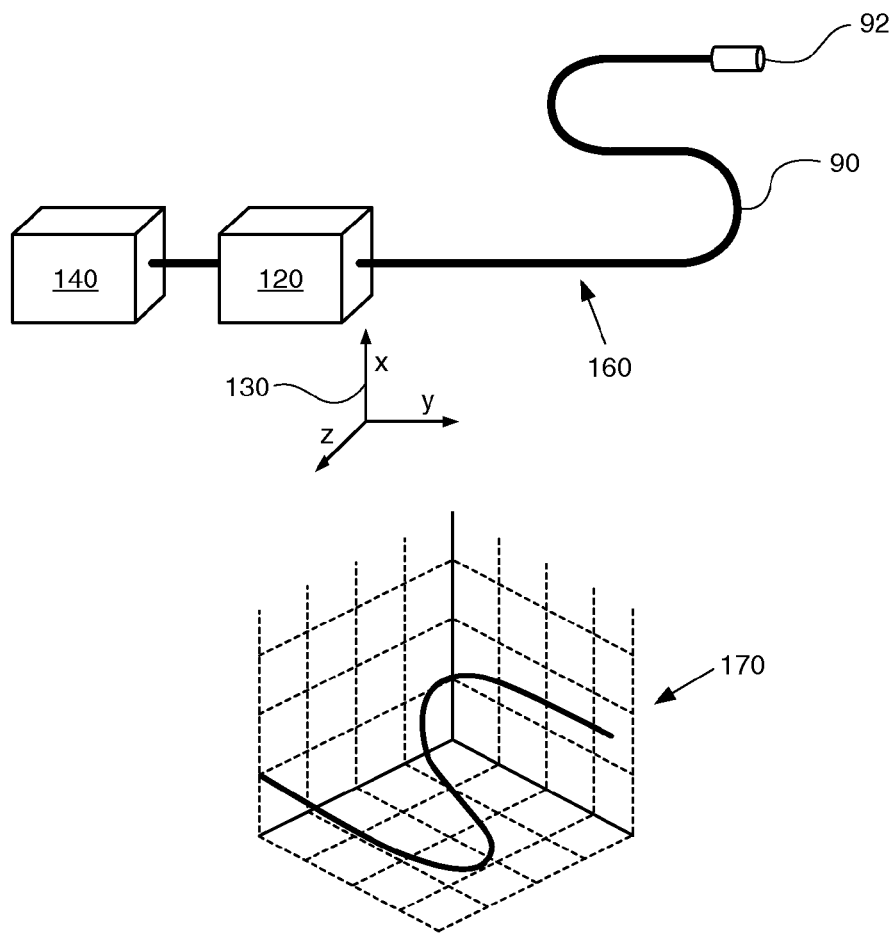

CYLINDER POSITION DETERMINATION USING FIBER OPTIC SHAPE SENSING

TECHNICAL FIELD

The present disclosure relates to optical determination of the stroke position of a hydraulic cylinder. The disclosure relates to a three-dimensional (3D) shape reconstruction of an optical fiber mounted on the hydraulic cylinder.

BACKGROUND

Hydraulic working machines such as excavators, track-type tractors, wheel loaders and the like use a plurality of hydraulic cylinders to provide actuating force for booms, sticks, buckets, and blades. Stroke or position sensors are commonly used to determine how far the rod has extended from the barrel of the hydraulic cylinder. The stroke information enables closed loop control of the actuation performed by the hydraulic cylinder. Closed loop control, in turn, enables automated digging operations. Accordingly, reliable stroke information is required to achieve reliable automated digging operations.

Hydraulic working machines operate in harsh environments. Temperature extremes, dust, dirt, high amplitude vibration, and shock are normal. The hydraulic cylinders, being on the business end of the machine, often experience the harshest conditions of the environment. The harsh environment reduces the reliability and durability of components that are intended to measure the stroke of a hydraulic cylinder. Optical methods can be obscured by dust. Waveguides and detectors can succumb to vibration. Hall effect sensors often use contact methods (odometry) to detect stroke and are susceptible to dust and hydraulic oil.

For example, U.S. Pat. No. 6,710,327 to Arshad et al., issued Mar. 23, 2004, entitled "Multi-fiber multi-cylinder position method and apparatus using time-of-flight technique," discloses an apparatus for measuring the time of flight of a light pulse for determining the stroke of a cylinder. The operation of the system, however, can be compromised by dirt or other contamination accumulating on the photodiode that receives the light signal.

A second example, U.S. Pat. No. 7,757,547 to Kageyama et al., issued Jul. 20, 2010, entitled "Cylinder stroke position measurement device," discloses an apparatus for determining the stroke of a cylinder using a sensor wheel and a Hall effect sensor. The Kageyama apparatus however is susceptible to dirt that could cause binding or slipping of the sensor wheel. The Kageyama apparatus is further susceptible to hydraulic oil that could cause slipping of the sensor wheel which could cause an inaccuracy in the cylinder stroke measurement.

A system and method for measuring the stroke of a cylinder that is less susceptible to dirt and contamination is required.

SUMMARY OF THE INVENTION

A system for determining the stroke of a hydraulic cylinder is disclosed. The system comprises a rod having a piston end and a connecting end, the rod slidably extending from a barrel. The barrel is fixed to a reference frame. A fiber optic shape sensing system associated with the hydraulic cylinder comprises an interrogation module fixed to the reference frame, a fiber bundle having a proximal end and a distal end, the proximal end joined to the interrogation module and the distal end having a fiber termination that is joined to the connecting end of the rod. A signal conditioning module connected to the interrogation module and configured to compute the location of at least one position of the fiber bundle relative to the reference frame; and provide an output signal indicative of the stroke of the connecting end relative to the barrel.

In another aspect of the current disclosure, a method for determining the stroke of a hydraulic cylinder is provided. The method comprises providing a hydraulic cylinder which comprises a rod having a piston end and a connecting end, the rod slidably extending from a barrel, the barrel fixed to a reference frame. The method further comprises providing a fiber optic shape sensing system associated with the hydraulic cylinder that comprises an interrogation module fixed to the reference frame, a fiber bundle having a proximal end and a distal end, wherein the proximal end joined to the interrogation module and the distal end has a fiber termination that is joined to the connecting end of the rod. The method further comprises receiving reflection spectrum information from the fiber bundle in a signal conditioning module connected to the interrogation module, computing the location of at least one position of the fiber bundle relative to the reference frame, and providing an output signal indicative of the stroke of the connecting end relative to the barrel.

BRIEF DESCRIPTION OF THE DRAWINGS

FIG. 1 is a view of an exemplary hydraulic cylinder according to the current disclosure;

FIG. 2 is a view of an exemplary shape sensing fiber bundle according to the current disclosure;

DETAILED DESCRIPTION

Figure 3:
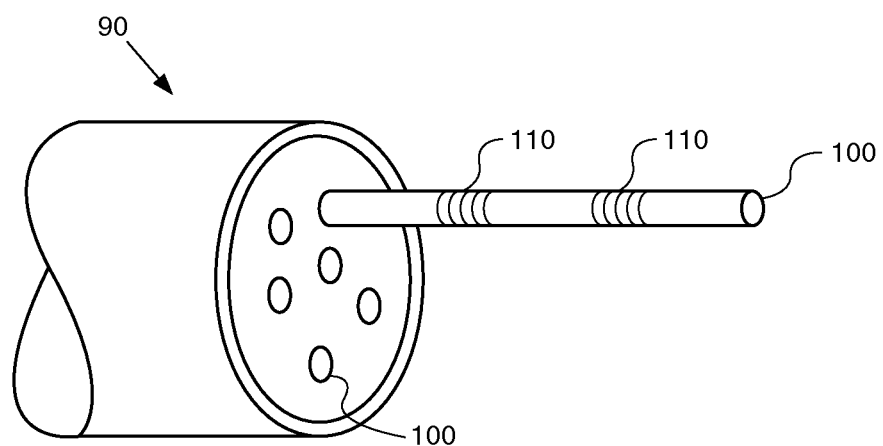
FIG. 3 is a view of an exemplary fiber optic shape sensing system and an exemplary 3D shape representation.

Referring to FIG. 1, a cylinder 10 is disclosed that provides actuating force through a stroke by application of an actuating fluid. The actuating force provides controlled motion of a linkage, such as a boom, bucket, or the like. The cylinder 10 may be single-acting or double-acting. The cylinder 10 comprises a barrel 20 having an end cap 50 at a first end and a rod end cap 60 at a second end. A piston 40 is enclosed within the barrel 20 and is slidably located within the inner diameter of the barrel 20. The piston 40 divides the barrel 20 into two chambers; a rod end 80 near the rod end cap 60 and the head end 70 near the end cap 50. A rod 30 is attached to the piston 40 at a first piston end 32 and extends through the rod end cap 60. A connecting end 34 of the rod 30 attaches to a boom, bucket, or the like. An actuating fluid such as hydraulic oil is provided to either the end cap 50 or rod end cap 60 ends of the barrel 20 via ports (not shown). Seals (not shown) in the rod end cap 60 keep the actuating fluid contained within the barrel 20.

Pressurized actuating fluid is provided to the barrel 20 through ports and either extends or retracts the rod 30 of the cylinder 10. Actuating fluid provided to the head end 70 will extend the rod 30 while actuating fluid provided to the rod end 80 will retract the rod 30.

FIG. 2 is a view of fiber optic shape sensing system 160. The fiber optic shape sensing system 160 includes a fiber bundle 90, an interrogation module 120, and a signal condition module 140. A representative reference frame 130 is shown, which is fixed to the interrogation module 120. The fiber bundle 90 is joined to the interrogation module 120 at a proximal end and includes a fiber termination 92 at a distal end. Interrogation module 120 is a device that is configured to transmit light to the fiber bundle 90 and receive reflected light from the fiber bundle 90 and provide 3D shape reconstruction 170. Information from the 3D shape reconstruction 170 is provided to signal condition module 140 which provides the location of at least one position of the fiber bundle 90 relative to the reference frame 130.

FIG. 3 is a view of an optical fiber bundle 90 including a multitude of fiber cores 100. A detailed view of a fiber core 100 is included for the sake of illustration. Two fiber Bragg gratings (FBGs) 110 are shown formed into the fiber core 100 which are illustrative of many such FBGs 110 typically formed along the full length of a fiber core 100.

It is known that each of the FBGs 110 may be interrogated for strain information. A fiber bundle 90 may contain two or more fiber cores 100 and the FBGs 110 in each fiber core 100 are located at the same length along the fiber core 100. As the index of refraction of a medium depends on stress and strain, the bend direction and axial twist of the fiber core 100 may be determined from the strains in each core's FBG 110. From the strain information from each fiber core 100 at each FBG 110 location along the length of the fiber core 100 the shape of the fiber core 100 can be determined.

A curvilinear coordinate system is defined with an origin at the proximal end of the fiber bundle 90 where it is joined to an interrogation module 120. A fiber termination 92 is located at the distal end of the fiber bundle 90. A Cartesian coordinate system is also defined as a base reference frame 130 having an origin coincident with the curvilinear coordinate system's origin.

To determine the approximate shape of the fiber core 100, the strain information measured at each FBG 110 location is used to determine the approximate local bend for the length of fiber core 100 without FBG 110. For example, the strain information from three fiber cores 100 in a fiber bundle 90 is used to compute the plane and the bend radius of the fiber bundle 90. Segments are defined at various locations along the fiber bundle 90, and each segment ends at a co-located ring of FBG 110 in the three fiber cores 100. Given the Cartesian x,y,z position of the FBG 110 ring being processed (i.e., the segment end position), the position of the next FBG 110 ring can be computed with simple geometry. The position of the first segment's end location with respect to the base frame 130 is then determined from the first segment's bend information. Next, strain information for the second segment is processed to determine the second segment's bend. The second segment's bend information is combined with the position of the first segment's end location to determine the second segment's end location position with respect to the base frame. Thus the position of each segment end location is determined with respect to the base frame 130, and the position information is used to determine the approximate shape of the fiber bundle 90. Accordingly, the position of multiple points along the fiber bundle 90, including the fiber termination 92, relative the base frame 130 can be determined. An example of a 3D representation of the shape of the fiber bundle 90 is shown in FIG. 2.

A second use of FBG 110 for the present disclosure employs Optical Frequency Domain Reflectometry (OFDR). This approach uses low reflectivity gratings all with the same center wavelength and a tunable laser source. The FBGs 110 may be located on a single optical fiber core 100. This allows hundreds of strain sensors to be located down the length of the fiber core 100. This configuration allows strain measurements to be acquired at much higher spatial resolution than other current sensor technologies, making it flexible enough to employ a user-selected grating density depending on the type of application.

The principles of operation of the fiber shape sensing concept are known and can be found in U.S. Pat. No. 8,116,601 to Prisco, issued Feb. 14, 2012, entitled "Fiber optic shape sensing," U.S. Patent No. 2013/0308138 to T Hooft et al., issued Nov. 21, 2013, entitled "FIBER OPTIC SENSOR FOR DETERMINING 3D SHAPE," and U.S. Pat. No. 7,715,994 to Richards et al., issued May 11, 2010, entitled "Process for using surface strain measurements to obtain operational loads for complex structures."

Figure 4:
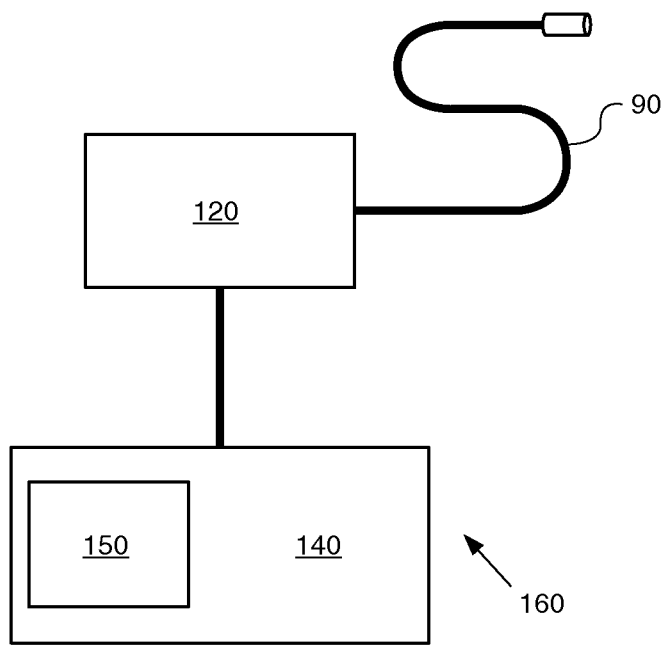
FIG. 4 is a block diagram of a fiber optic shape sensing system according to the current disclosure.

Referring to FIG. 4, the interrogation module 120 is a device that is configured to transmit light to the fiber bundle 90 and receive reflected light from the fiber bundle 90. The interrogation module 120 may use a laser as a light source. The interrogation module 120 may also contain a microprocessor, a storage medium such as magnetic, optical, or solid state, and input/output circuitry.

A signal conditioning module 140 is a system or device configured to receive the reflection spectrum data from the interrogation module 120 and provide a signal indicative of the stroke of the hydraulic cylinder 10. The signal conditioning module 140 may contain a 3D shape reconstructor 150. The signal conditioning module 140 may also contain microprocessor, a storage medium such as magnetic, optical, or solid state, and input/output circuitry.

A 3D shape reconstructor 150 is a system or device configured to receive reflection spectrum data from the interrogation module 120 and generate local strain data as a function of position along fiber bundle 90. Accordingly, the 3D shape reconstructor 150 translates the reflection spectrum data into a 3D shape of the fiber bundle 90.

Figure 5:
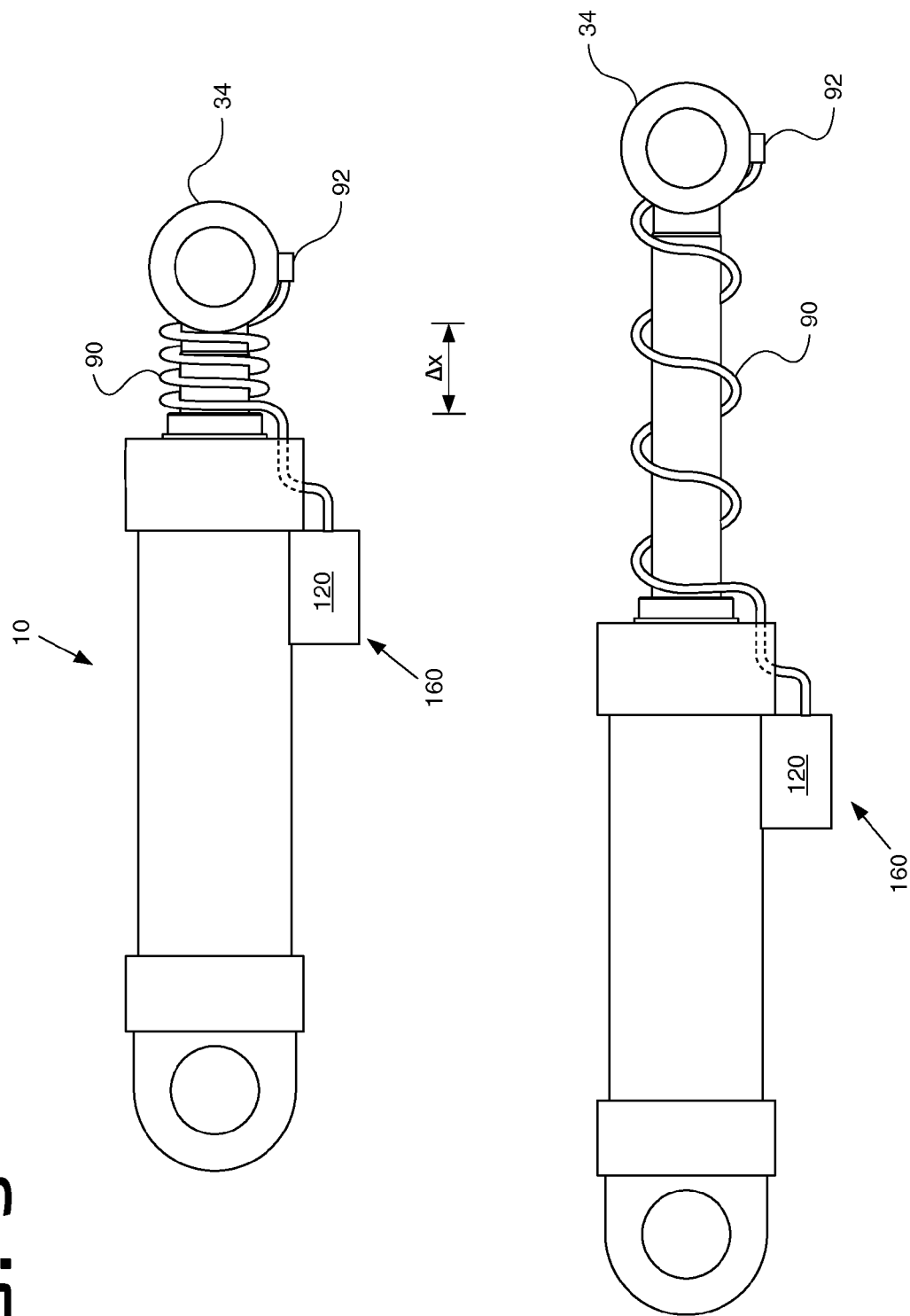
FIG. 5 is a view of a system for determining the stroke of a hydraulic cylinder according to the current disclosure.
Figure 6:
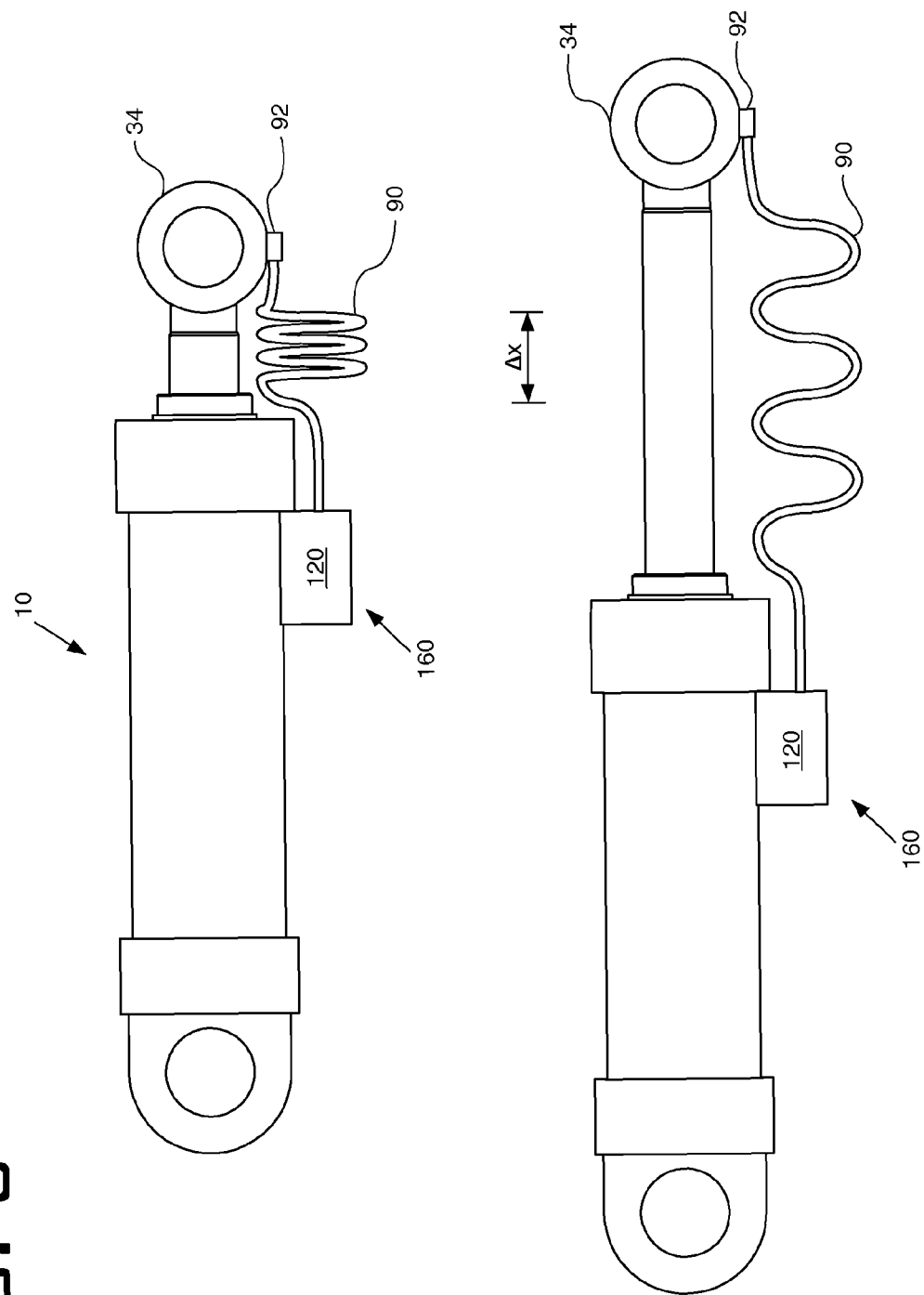
FIG. 6 is another view of a system for determining the stroke of a hydraulic cylinder according to the current disclosure.

Referring to FIGS. 5 and 6, a fiber optic shape sensing system 160 is shown as applied to a cylinder 10. The interrogation module 120 is shown attached to the barrel 80 such that both are fixed to the same reference frame 130. It should be appreciated by those skilled in the art that the interrogation module 120 and barrel 20 could each be mounted to an intermediate member such as a frame member or a bracket and yet still be fixed to the same reference frame 130. The signal conditioning module 140, not shown, may be located elsewhere and connected to the interrogation module 120 via a wired or wireless connection.

Fiber bundle 90 is joined to the interrogation module 120 at a proximal end and is attached to the connecting end 34 at a distal end. The fiber bundle 90 may take any arrangement between the interrogation module 120 and the connecting end 34. As will be appreciated by those skilled in the art, the fiber optic shape sensing system 160 will determine the stroke of the cylinder 10 as long as the fiber termination 92 or a predetermined location of fiber bundle 90 is located at connecting end 34. Furthermore, any portion of rod 30 that does not retract into the barrel 20 is suitable to be associated with the fiber termination 92 or a predetermined location of fiber bundle 90 to determine the stroke of cylinder 10.

In one aspect of the current disclosure, shown in FIG. 5, the fiber bundle 90 is coiled around rod 30 such that strain relief is provided. In a second aspect of the current disclosure, shown in FIG. 6, the fiber bundle 90 is coiled adjacent to the rod 30. The fiber bundle 90 may be routed along any convenient path such that enough strain relief is provided to account for the stroke of the rod 30.

INDUSTRIAL APPLICABILITY

A fiber optic shape sensing system 160 is used to determine the stroke of a cylinder 10. An interrogation module 120 is configured to transmit light to the fiber bundle 90 and receive reflected light from the fiber bundle 90. A signal conditioning module 140 is configured to receive the reflection spectrum data from the interrogation module 120 and provide a signal indicative of the stroke of the hydraulic cylinder 10.

A signal indicative of the stroke of the hydraulic cylinder 10 can be provided to a controller, allowing closed loop control of a hydraulic working machine. For example, the flow of actuating fluid supplied to the hydraulic cylinder 10 may be controlled via an electrohydraulic valve. The flow through the valve may be controlled by current provided by the controller to a solenoid. A signal indicative of the stroke of the hydraulic cylinder 10 may thereby be used to provide closed loop position control of the hydraulic cylinder 10.

The invention claimed is:

1. A system for determining the stroke of a hydraulic cylinder comprising:
  a hydraulic cylinder comprising:
    a rod having a piston end and a connecting end;
    said rod slidably extending from a barrel, said barrel fixed to a reference frame;
  a fiber optic shape sensing system associated with the hydraulic cylinder comprising:
    an interrogation module fixed to said reference frame;
    a fiber bundle having a proximal end and a distal end;
    said proximal end joined to said interrogation module;
    said distal end having a fiber termination that is joined to said connecting end of said rod;
  a signal conditioning module connected to said interrogation module and configured to:
    compute the location of at least one position of the fiber bundle relative to the reference frame; and
    provide an output signal indicative of the stroke of said connecting end relative to said barrel.

2. The system of claim 1 wherein the at least one position of said fiber bundle is joined to said connecting end of said barrel.

3. A method for determining the stroke of a hydraulic cylinder comprising:
  providing a hydraulic cylinder comprising:
    a rod having a piston end and a connecting end;
    said rod slidably extending from a barrel, said barrel fixed to a reference frame;
  providing a fiber optic shape sensing system associated with the hydraulic cylinder comprising:
    an interrogation module fixed to said reference frame;
    a fiber bundle having a proximal end and a distal end;
    said proximal end joined to said interrogation module;
    said distal end having a fiber termination that is joined to said connecting end of said rod;
  receiving reflection spectrum information from the fiber bundle in a signal conditioning module connected to said interrogation module;
  computing the location of at least one position of the fiber bundle relative to the reference frame; and
  providing an output signal indicative of the stroke of said connecting end relative to said barrel.

4. The method of claim 1 wherein the at least one position of said fiber bundle is joined to said connecting end of said barrel.

* * * * *